United States Patent [19]
Arnold

[11] 4,078,610
[45] Mar. 14, 1978

[54] LOW FRICTION LOSS METHOD FOR FRACTURING A SUBTERRANEAN GEOTHERMAL EARTH FORMATION

[75] Inventor: George B. Arnold, Houston, Tex.

[73] Assignee: Texaco Inc., New York, N.Y.

[21] Appl. No.: 686,764

[22] Filed: May 17, 1976

Related U.S. Application Data

[62] Division of Ser. No. 570,157, April 21, 1975.

[51] Int. Cl.² .......................................... E21B 43/26
[52] U.S. Cl. ..................................... 166/280; 166/308
[58] Field of Search .............. 166/280, 308, 259, 271; 252/8.55 A

[56] References Cited

U.S. PATENT DOCUMENTS

| | | | |
|---|---|---|---|
| 3,026,938 | 3/1962 | Huitt et al. | 166/280 |
| 3,242,988 | 3/1966 | McGuire, Jr. et al. | 166/280 |
| 3,376,930 | 4/1968 | Kiel et al. | 166/280 |
| 3,500,927 | 3/1970 | Simpson | 166/292 |
| 3,730,275 | 5/1973 | McClaflin et al. | 166/308 |

*Primary Examiner*—Stephen J. Novosad
*Attorney, Agent, or Firm*—Thomas H. Whaley; Carl G. Ries; Walter D. Hunter

[57] ABSTRACT

A low friction loss process for fracturing subterranean formations where the fracturing fluid includes a metal-plated, polymer-coated propping agent. Useful polymers include low-density polyethylene, polypropylene, etc.

10 Claims, 1 Drawing Figure

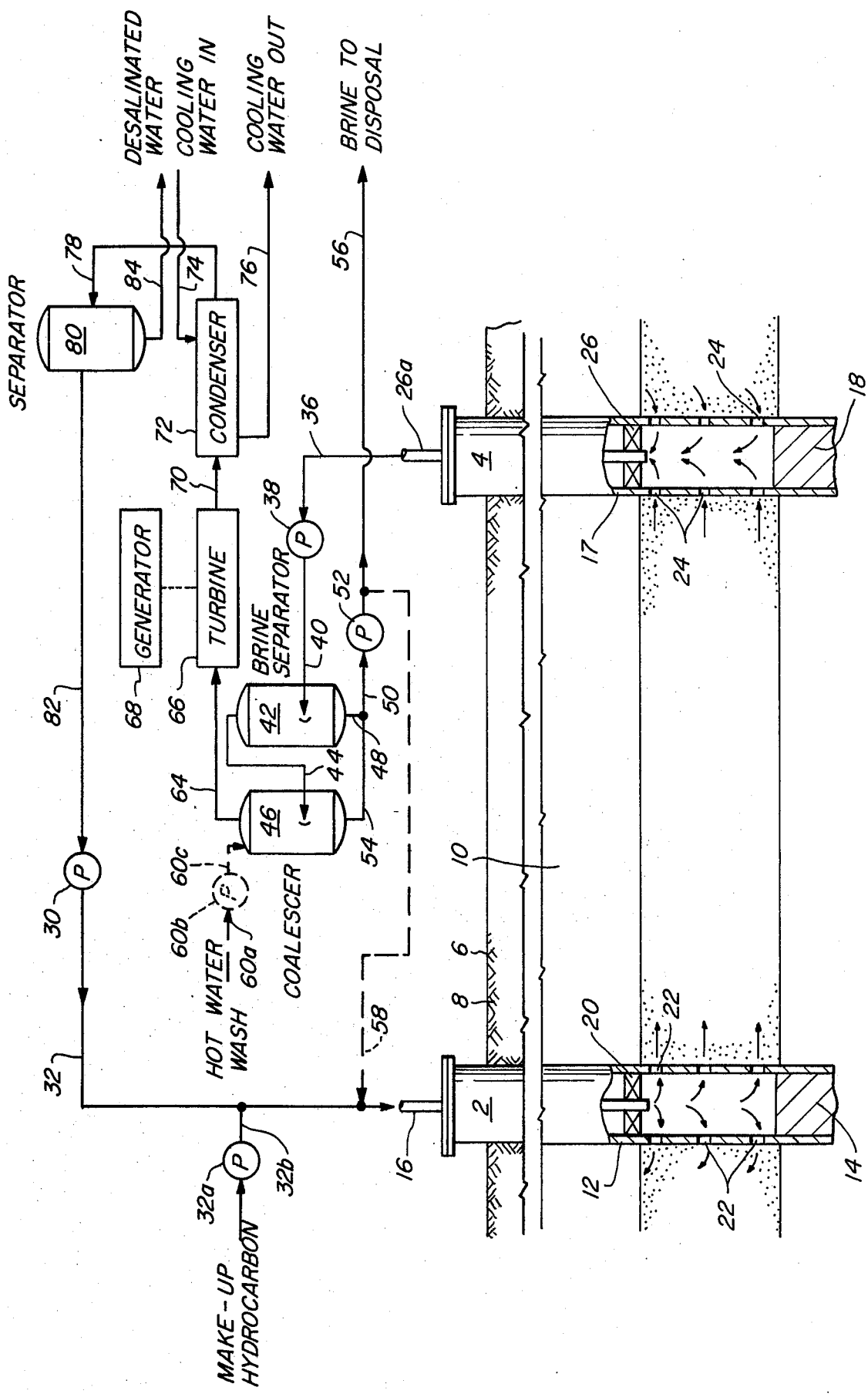

LOW FRICTION LOSS METHOD FOR FRACTURING A SUBTERRANEAN GEOTHERMAL EARTH FORMATION

This is a division of applicaton Ser. No. 570,157, filed Apr. 21, 1975.

BACKGROUND OF THE INVENTION

Field of the Invention

This invention relates to a method of fracturing a geothermal formation. More particularly, this invention relates to a fracturing method in which the fracturing fluid includes a metal-plated propping agent coated with a thermoplastic polymer.

Prior Art

One of the major sources of energy in the world is the natural heat of the earth. A number of attempts have been made to recover heat from the geothermal formations or hot formations of the earth; however, only an extremely small quantity of energy compared to the total amount consumed is derived from this source at the present time. In California alone over 1 million acres of land are classified as being in geothermal resource areas. Steam derived from geothermal sources is being employed in the United States, Italy, Mexico, Russia, New Zealand and Japan to drive turbines for electrical power generation. In Iceland, hot water derived from hot artesian wells or springs is transmitted through pipes and utilized in heating buildings and greenhouses.

The desirability of utilizing heat derived from a geothermal source is apparent since the fossil fuel sources, i.e., coal, oil, peat, etc. are limited and can be exhausted within a few decades at the present rate of production.

All of the installations in operation today employing energy derived from geothermal sources operate with hot water and/or steam derived from geothermal formations into which underground water flows and becomes heated. One of the most successful geothermal installations is that operated in Northern California to produce electricity. In this geothermal reservoir subterranean water contacting the hot reservoir rock structure is flashed into steam forming a very large steam reservoir at temperatures of the order to 500°–550° F. or more while shut-in pressure of the wells below 2000 feet is 450–480 psig.

The use of steam and/or hot water produced in geothermal reservoirs suffers from several major disadvantages. Frequently, large volumes of noxious gases such as hydrogen, sulfide, carbon dioxide, hydrocarbons, ammonia, etc. are produced with the steam or water and these gases must be removed and disposed of in a manner which will not pollute the environment. The mineral content of the steam and/or water recovered from any geothermal wells is so high that the steam recovered may be so corrosive as to preclude its use in turbines, etc. In most instances where water is recovered with the steam, the salinity is usually of such magnitude that the cool brine can be discharged to surrounding streams or lakes only after being treated to reduce the salinity to an acceptable value. Furthermore, many plants which utilize steam from geothermal reservoirs for turbine power generation discharge a condensate from the condensers which is so high in boron that the toxic effluent must be sent to an appropriate treatment plant or returned to the underground reservoir through a disposal well.

There is a definite need in the art therefore for a process in which energy in the form of heat can be recovered from a geothermal formation without the removal from the formation of substantial quantities of the highly corrosive brines associated with these formations. Among the advantages of such a process are: (1) subsidence of the producing area would be prevented and (2) the heat transfer medium, i.e., the brine, would be retained in the formation.

There is a definite need in the art for a low friction loss method of fracturing geothermal formations in which the propping agents included with the fluid employed in the fracturing process also will serve to improve the rate of heat transfer between the hot formation and the fluid therein

BRIEF SUMMARY OF THE INVENTION

In its broadest sense this invention is concerned with a low friction loss method for fracturing a subterranean earth formation penetrated by a well in which the fracturing fluid is injected through the well and into the earth formation at a high velocity to cause fracturing of the formation. In this invention the fracturing fluid injected into the formation via the said well contains a metal-plated, propping agent coated with a thermoplastic polymer.

A wide variety of organic fluids having a low solubility in water are useful in the method of this invention. Suitable fluids include, for example, normally liquid hydrocarbons having from 4 to 10 inclusive carbon atoms such as propane, butane, pentane, heptane, octane, decane, etc., and isomers and mixtures thereof. Other suitable hydrocarbons include selected hydrocarbon cuts such as middle distillates, naphthas, etc. The preferred hydrocarbons are those which have low mutual solubility with water. Any hydrocarbon fluid having suitable physical and thermodynamic properties which does not react chemically with the geothermal formation to any excessive degree may be employed in the method of this invention.

The heated organic fluid withdrawn from the production well in the process of this invention may be in vapor form, a mixture of vapor and liquid or liquid alone depending on the temperature of the fluid as it leaves the hot, geothermal formation and enters the borehole of the production well and on the pressure maintained in the withdrawal system. Preferably, in the process of this invention the organic fluid withdrawn from the production well is maintained in the liquid state through the use of appropriate pressure control valves.

In another aspect, this invention relates to a process for converting the heat energy of the heated organic fluid recovered from the production well in liquid phase which comprises:

(a) separating brine from the said organic fluid in liquid phase, (b) reducing the pressure in the said liquid phase thereby converting the organic fluid to a vapor phase, (c) expanding the organic fluid in vapor phase in a power extracting gas expansion device, and (d) condensing the organic fluid in vapor phase after expansion thereby forming an organic fluid liquid phase and a separate water liquid phase derived from water dissolved in the organic fluid recovered from the production well.

After step (d) the organic fluid in liquid phase is separated from the water phase and recycled to the geothermal formation. The power extracting gas expansion device can be, for example, a turbine which can be direct connected to an electrical generator, if desired.

In the process of this invention the heated organic fluid recoverd from the production well can be passed through a boiler or heat exchanger where it is employed to heat and/or vaporize a second fluid or working fluid which can be, for example, water, steam, isobutane, pentane, isopentane, ethylene glycol, kerosene, crude oil, etc., or, alternatively, the heated fluid recovered from the production well may be utilized directly for heating purposes or as a reactor input stream, etc., and where the recovered heated fluid is a vapor it can, if desired, be employed directly to drive a turbine, etc.

The working fluid leaving the heat exchanger may be employed in a variety of ways as a heating medium for such process requirements as steam raising, evaporation, reactor heating, preheating of reactor input streams, etc. The heated working fluid may also be employed in agricultural production to heat fields, greenhouses, etc., thus permitting a number of crops to be grown in areas with short growing seasons by preventing frost damage and freezing of the ground.

As the organic liquid is forced through the geothermal formation, it contacts by the hot brine in the geothermal formation as well as the hot geothermal formation itself and is heated to formation temperature which may be from about 250° to about 900° F. and preferably, from about 400° to about 900° F. In this process the handling of corrosive brine or steam contaminated with brine is minimized by an in situ transfer of heat to the organic fluid. The brine components are insoluble in the organic fluid and the hot organic fluid recovered via the production well is substantially free of brine components. Since a small amount of brine may be carried out of the formation with the hot organic fluid, it is preferable to send the hot organic fluid recovered via the production well to a separator located on the surface for removal of the brine prior to utilization of the fluid in turbine operation.

After the organic fluid has been expanded to form a gaseous phase and, for example, employed for driving a turbine, it is sent to heat exchanging device where it is condensed. The heated fluid leaving the heat exchanger also may be utilized in a variety of heating operations such as heating crude oil serving as refinery feedstock. During the passage of the organic fluid through the geothermal formation a small amount of water derived from the brine is dissolved in the organic fluid and this water is preferably removed from the organic fluid after the fluid has been condensed in the heat exchanging device. This is accomplished by sending the condensed organic fluid to a gravity separator or decanter. From the bottom of this separator desalinated water is removed while condensed organic fluid is withdrawn from the top and recycled to the geothermal formation via the injection well. The desalinated water may likewise be returned to formation via the injection well or it may be utilized as boiler feed water, etc.

The process of this invention offers a number of distinct advantages over processes previously proposed for utilizing geothermal energy such as the following:

1. Heat is transferred to a non-corrosive working fluid, a hydrocarbon, which is separated from the brine in the formation and circulted to the surface to recover the heat. High alloy, stainless steels are not needed effecting a large savings in capital investment.

2. The low corrosion characteristic of the hydrocarbon fluid greatly reduces the maintenance compared to systems utilizing brines.

3. Electric power is recovered from the heated hydrocarbon working fluid without producing by-products such as brine streams which would either have to be returned to the formation or discharged to the environment.

4. A near pollution free operation is obtained.

BRIEF DESCRIPTION OF THE DRAWING

The FIGURE shown is a schematic drawing illustrating recovery of heat from a geothermal formation where an organic fluid in a closed circuit is passed through a geothermal formation, withdrawn from a production well and heat derived from the fluid is utilized in preparing electrical power.

DETAILED DESCRIPTION OF THE INVENTION

As previously pointed out, this invention is concerned with a method of fracturing geothermal reservoir formations which contain a substantial amount of brine. In this specification a geothermal reservoir is defined as a reservoir or system where rock formations are heated by the normal geothermal gradient and where there is fluid generally in the form of brine for heat transfer. Wells, i.e., the injection and production wells, employed can be drilled utilizing the same equipment and techniques employed in drilling wells for the recovery of petroleum hydrocarbons. These geothermal reservoir formations generally will be situated from about 1000 to about 30,000 feet or more below the surface.

A number of injection wells and production wells may be utilized simultaneously in recovery heat from the geothermal reservoir. Such wells may be arranged in any convenient pattern such as the inverted five-spot pattern, the inverted seven-spot pattern, or in any other suitable pattern. In the inverted five-spot pattern four production wells are situated at corners of a square while a single input well is located at the center of the square. The distance between a production well and an injection well can be varied widely depending upon the temperature of the formation, the particulr organic fluid being circulated through the hot formation, the circulation rate of the fluid and the increase in temperature desired in the injected organic fluid, etc. Generally, the distance between any particular injection well and production well will be from about 10 to about 400 feet or more.

If the fluid conductivity of the geothermal reservoir formation penetrated by the injection or production well is found to be low, as is frequently the case, or if it is desired to further increase the fluid conductivity, the formation in the injection well, production well, or both may be subjected to remedial action in order to increase the permeability of the formation. One common method for increasng the permeability of the formation which has been practiced for a number of years in the art is known as hydraulic fracturing. In this method artificial fractures or channels of high fluid conductivity within the formation can be formed.

The geothermal reservoir formation in the injection well or the production well can be conveniently fractured by methods well known in the art by pumping a fluid down the well bore and into contact with the formation at a rate higher than that at which the fluid can flow into and through the formation. On continued injection of the fluid, the pressure within the well bore increases to a pressure at which the formation breaks down to create one or more fractures or fissures extending outwardly from the well bore into the formation. The hydraulic fracturing fluid is injected into the formation at a sufficient pressure and flow rate to generate the required fracture and to displace the fluid into the fracture under laminar flow conditions. Any of the commonly employed hydraulic fracturing fluids such as water, hydrocarbon oils or oil-in-water emulsions, etc., together with viscosity thickeners and other additives may be used in fracturing the geothermal reservoir formations.

After the pressure on the fracturing fluid has been reduced, the fractures will tend to close somewhat because of the unbalanced compressive forces in the formation. If desired, propping agents may be included in the hydraulic fracturing fluids previously described to prevent closure of the fractures, or they may be introduced into the fractured formation as a component of an aqueous fluid, a hydrocarbon fluid, etc., after the initial fracturing operation has been completed. Useful propping agents include sand grains, metal shot including steel shot, plastic particles, glass beads, ceramic particles, etc.

The quantity of the fracturing fluid required per well will vary widely depending on the physical properties of the formation, the thickness. For example, in a typical fracturing operation of a well employed in the process of this invention a mixture comprising about 10,000 to about 60,000 pounds of sand in 2,000 barrels or more of kerosene or water is used.

Hydraulic fracturing methods suitable for use in fracturing wells completed in geothermal reservoir formations are more fully described in U.S. Pat. Nos. 3,638,727, 3,010,513, 3,366,176, 3,376,929, 3,497,008, 2,944,018, 2,962,095, 3,149,673, 3,175,615, 3,317,967, etc.

One of the problems associated with the recovery of energy in the form of heat from geothermal formations is the low rate of heat transfer from the formation to the fluid being heated. It has been found that this rate of heat transfer can be substantially improved if during the fracturing step propping agents having metallic surfaces such as metal shot including steel shot or sand grains which have been metal plated either electrolessly or by electroplating are employed. Nickel or cobalt are the preferred metals for forming such coatings since they are highly resistant to the corrosive brines present in the formation.

In preparing electrolessly plated sand grains in the first step sand grains having a size of 8 to 40 Tyler Mesh (i.e., 0.016 to 0.093 inches) are boiled in hydrochloric acid (5 weight percent) for about 1 hour, removed from the acid bath and thoroughly washed with clean water. Next, the grains are immersed in an aqueous solution containing an activating agent, such as colloidal palladium formed by the reaction of stannous chloride and palladium chloride, for the purpose of activating the surface of the particles to be plated. The formula composition of a suitable activating solution is as follows:

$PdCl_2$ — 1.1 g
Water — 560 ml
HCl (cmc) — 285 ml
$SnCl_2$ — 50 g

Compositions of this type are more completely described in U.S. Pat. No. 3,011,921 which is incorporated herein in its entirety. Finally, the thus-activated sand grains are electrolessly plated by immersion with vigorous mixing in an aqueous plating solution containing a metal plating compound and a reducing agent. The composition of a suitable electroless nickel plating solution is as follows:

$N_1Cl_2 \cdot 6H_2O$ — 35 g
$NaH_2PO_2 \cdot H_2O$ — 12 g
$NH_4Cl$ — 60 g
Trisodium Citrate $\cdot 5.5H_2O$ — 110 g
Water to make — 1 liter
Operate at 195° F., Adjust pH to 8–10 with $NH_4OH$.)

If it is desired to electrolessly plate the sand grains with cobalt, the following composition can be utilized:

$CoCl_2 \cdot 6HO$ — 30 g
$NaH_2PC_2 H_2O$ — 22 g
Rochelle salts ($NaKC_4H_4O_6 \cdot 4H_2O$) — 200 g
$NH_4Cl$ — g
Water to make — 1 liter
(Operate at 190° F. at pH of 8.5 to 10, Adjust pH with $NH_4OH$.)

The plated sand grains are then removed from the plating solution, washed with clean water and dried in a hot air drier. Metal shot such as steel shot may be electrolessly plated with a coating of nickel or cobalt metal in the same manner as disclosed above.

In accomplishing the first step of the electroless plating operation, as activater solutions one may use acidic solutions of palladium chloride and/or stannous chloride, or the corresponding bromide, nitrate or sulfate solutions. The activator solution should also contain a reducing agent, such as hydrazine, sodium hypophospite, a low aldehyde, e.g., formaldehyde, etc.

Preferably, the activator liquids are acid aqueous solutions acidified with acetic, formic or hydrochloric acid, etc. Other activator fluids which can be employed are aqueous solutions containing gold, ruthenium, rhodium or platinum, etc., together with a reducing agent such as hydrazine, and with or without a protective colloid such as gum arabic, tragacanth gum, gelatin, etc. The function of the reducing agent is to reduce the metal salt in the activator solution to the free metal which may be in colloidal form. Other activator liquids commonly used for electroless metal plating of nonmetallic objects may similarly be used.

The metal-containing plating solution can be acidic, having a pH of from 2 to 6, and a pH range of from 4 to 6 is especially preferable. Alkaline metal plating solutions may also be used, where desirable.

Metal plating compositions suitable for use in the preparation of the steel or sand plated particles include, for example, nickel, or cobalt chlorides and/or the corresponding sulfates. Reducing compositions useful in such electroless plating compositions include reagents such as hypophosphorous acid, hypophosphites, e.g., sodium hypophospite, or alkaline solutions of formate, molybdenate and/or hydroxy carboxylates. The metal-containing compounds and the reducing agents may be present in concentrations ranging from about 1 to about 40 percent by weight each. A variety of suitable electroless metal plating solutions have been described in U.S. Pat. Nos. 3,393,737, 3,500,926, 3,500,927, 3,586,524, 3,438,411, etc., which are incorporated herein by reference in their entirety. The initially applied electroless coating can be electroplated over with nickel or cobalt until the desired metal thickness is obtained.

In order to protect the thin, plated metal film on the steel shot or on the sand grains as they are carried into the formation during the fracturing operation, the plated particles may be coated with for example, a thin film of low-density polyethylene (density about 0.91 to about 0.94 g/cc or high-density polyethylene (density about 0.95 to about 0.97 g/cc), or any other thermoplastic having a melting point below about 300° F. The plastic film thickness needed can range from 0.001 to 0.005 inch although a thickness more or less than set out in this range can be utilized, if desired.

In preparing polymer-coated, plated sand grains a solution of from about 0.5 to about 1.5 percent or more by weight of the thermoplastic polymer prepared by dissolving pellets of the polymer in 1,1,2-trichloroethane, 1,1,2,2-tetrachloroethane, carbon tetrachloride, or chlorobenzene, etc. at temperatures about 100° C. Plated sand grains having a Tyler mesh size of about 8 to 40 are then added with stirring to the thus-prepared polymer solution after which the polymer-coated grains are separated from the solution and dried. In a specific illustration of the preparation of such polymer-coated, plated sand grains a solution of 0.7 weight percent low density polyethylene is formed by adding polyethylene pellets with stirring to 1,000 gallons of chlorobenzene at 105° C. To this polymer solution 2,000 lbs. of clean nickel-plated sand having a Tyler mesh size of 8 to 20 are added with vigorous mixing to the chlorobenzene solution maintained at about 105° C. Mixing is continued for about 20 minutes after which the coated, plated sand grains are recovered by filtration and then dried by tumblind in hot air at a temperature of about 130° F.

An added advantage in using the polymer-coated propping agents such as the plated sand grains or steel shot in the fracturing process utilized in this invention is that a substantial reduction in friction loss is achieved at the pressures employed which may be as high as 3,000 to 10,000 psi or more (measured at the surface). Polymer-coated sand grains which have not been metal plated prepared in the same manner as described above may also be used in the fracturing operations of this invention. After the polymer-coated propping agents have been deposited in the formation from an aqueous or hydrocarbon fracturing fluid, the coating is gradually removed by the hydrocarbon being circulated through the formation since the temperature in the formation is generally substantially above the melting point of the polymer and the solubility of these polymers in the hydrocarbons at these temperatures is in most cases appreciable. In this manner the polymer coating is removed from the plated, propping agents and the clean, metallic, high heat transfer surfaces of these propping agents are exposed.

Additional reduction in friction losses during the fracturing operation can be achieved where aqueous fracturing fluids of the type previously described containing any of the above-described propping agents are employed by adding 0.005 to about 3 weight percent of a polyacrylamide polymer or a partially hydrolyzed polyacrylamide polymers in which 20 to 40 percent of the available amide groups are hydrolyzed with for example, sodium hydroxide. Only high molecular weight polyacrylamides having a molecular weight such that a 0.5 weight percent solution of the polymer in a 4 weight percent aqueous sodium chloride solution has an Ostwald viscosity in the range of 8 to 60 centipoises at 25° C. are useful. These polymers are more completely described in U.S. Pat. No. 3,254,719.

In the low friction loss method of fracturing a subterranean formation penetrated by a well a fracturing fluid is injected through the well into the earth formation at a high velocity to cause fracturing of the formation, which comprises adding to the fracturing fluid selected from the group consisting of aqueous fluids and hydrocarbon fluids, a propping agent selected from the group consisting of steel shot or sand grains electrolessly plated with nickel or cobalt and coated on the plated metal surfaces thereof with a thermoplastic polymer, preferably having a melting point less than 300° F., and, optimally a small quantity of a polyacrylamide or hydrolyzed polyacrylamide friction loss reducing agent and injecting the resulting mixture into the formation via the said well.

In the preferred method of practicing the fracturing operation, a slug of about 5,000 to about 150,000 gallons of the fracturing fluid which can be water, brine, oil, kerosene, middle distillate, etc. containing about 0.2 to about 5.5 pounds per gallon of the propping agent, is injected down the well and into contact with the formation under a pressure and volume flow rate sufficient to form a fracture in the formation extending outwardly from the well bore which is propped open by the propping agent.

In the FIGURE there are shown injection well 2 and production well 4 which are 220 feet apart and which extend from the surface of earth 6 down through the upper formation 8 into a geothermal formation 10 having associated with it corrosive brine and steam and exhibiting a temperature of about 600° F. Well 2 is cased with steel pipe casing 12 and the bottom of the well is plugged back with a suitable cement layer or plug 14. The 20 foot interval (8,210 –8,230 feet) above plug 14 of the casing in well 2 is perforated in a conventional manner to form a fluid passageway between the well bore and formation 10 via perforations 22. Steel tubing 16 is installed in the well bore to a point about 20 feet above plug 14 where it passes through packer 20.

Well 4 is cased with steel pipe casing 17 and the bottom of this well is plugged back with a suitable cement layer 18. Both wells 2 and 4 are completed at the same depth in the geothermal formation. The 20 foot interval above plug 18 of casing 16 is perforated in conventional manner to form a fluid passageway between the well bore and the formation 10 via perforations 24. Steel tubing 26a is installed in the well bore of well 4 to a point about 20 feet above plug 18 where it passes through packer 26.

Prior to injection of the organic fluid into the geothermal formation hydraulic fracturing of the formation in both the injection well and the production well is carried out.

Injection well 2 is prepared for hydraulic fracturing in the usual manner and fracturing is accomplished by injecting via steel pipe casing 12 and into the formation through casing perforations 22, 25,000 gallons of fresh water gelled with guar gum and containing 1.3 pounds per gallon of nickel-plated sand grains with an outer coating of low-density polyethylene at the rate of about 30 barrels per minute at a pressure of 4,000 psig (max.). Production well 4 is hydraulically fractured in the same manner employing the same type of fracturing fluid.

By means of high pressure pump 30 liquid pentane at a temperature of about 150° F. is passed via line 32 into tubing 16 of well 2. Makeup, liquid hydrocarbon (i.e., pentane) is introduced into line 32 by means of high pressure pump 32a and line 32b. The liquid hydrocarbon is then transmitted downwardly through tubing 16 and forced into formation 10 through perforations 22. As the liquid hydrocarbon is forced through the formation 10, it contacts the hot corrosive brine and steam contained therein and is heated and enters the wellbore of well 4 through perforations 24 at a temperature of about 590° F. From the wellbore of well 4 it is withdrawn via tubing 26a and conducted by line 36 to pump 38 and then passed via line 40 into brine separator 42 where the very small amount of brine brought up from the geothermal formation in the hot hydrocarbon fluid is permitted to settle out. The hot hydrocarbon fluid is withdrawn from the top of separator 42 and is passed by means of line 44 into coalescer 46 to remove the last traces of brine. Optionally, one may introduce via line 60a, high pressure pump 60b and line 60c a small amount of hot water to aid in the separation of the final traces of brine in coalescer 46. Brine from the bottom of brine separator 42 is passed by line 48 and 50 to the suction side of pump 52 and brine from the bottom of coalescer 46 also is sent via line 54 and line 50 to the suction side of pump 52. From the discharge side of pump 52 the removed brine is transmitted via line 56 to a disposal unit for recovery of chemicals contained in the brine or, optionally, the brine can be returned to the formation via line 58. From the coalescer 46 the hot liquid hydrocarbon is passed via line 64 to low pressure turbine 66 where it is expanded into gaseous phase. Low pressure turbine 66 which is directly connected to a suitable electrical generator 68. Leaving turbine 66 via line 70 the exhaust vapors are conducted to a shell and tube condenser 72 where they are condensed to form a pentane phase and a separate water phase derived from the small amount of water which dissolves in the pentane as it is passed through the geothermal formation. Condenser 72 is cooled by water which enters via line 74 at a temperature of about 100° F. and leaves the condenser at about 130° F. via line 76. Alternatively, 72 may be a secondary heat recovery device. Liquid pentane and water are withdrawn from condenser 72 via line 78 and passed to water separator 80 which serves to remove the water phase. From the top of separator 80 the liquid pentane phase is sent to suction side of pump 30 via line 82. Desalinated water which separates from the liquid hydrocarbon stream is removed from the bottom of separator 80 via line 84 for utilization as boiler feed water, etc. or it may be returned to the formation along with the liquid hydrocarbon, if desired.

A single well method of heating a fluid in a brine-containing geothermal reservoir formation penetrated by a well having two separated fluid flow passages terminating at different levels in the geothermal formation may also be practiced. Such a process comprises (a) pumping an organic fluid having a low solubility in water down the deeper of the fluid flow passages of the said well and into the formation thereby heating the said organic fluid, (b) recovering the heated organic fluid substantially free of brine through the shallower flow passage in the said well, and wherein the temperature of the said geothermal reservoir formation is substantially above the temperature of the fluid introduced into the formation in step (a).

Preferably, at least a portion of that section of the geothermal formation between the terminal levels of the two flow passages of the well is hydraulically fractured in the manner set out above. Any of the organic fluids mentioned above can be utilized in the single well method such as the normally liquid hydrocarbons having from 4 to 10 inclusive carbon atoms.

In this method of operating a single well penetrating the geothermal formation and having a casing set about 20 to about 50 feet or more above the bottom of the well is utilized. Tubing is run to a point below the casing but from about 2 to about 10 feet or more above the well bottom and preferably the well bore section between the bottom of the casing and the bottom of the well is fractured in the same manner as previously described to open up the formation. The recycling hydrocarbon which is introduced into the hot geothermal formation via the deeper extending tubing circulates upwardly in the formation and the heated fluid is withdrawn via the shallower flow passage, i.e. the annulus between the tubing and the casing. Utilization of the heated hydrocarbon fluid at the surface is conducted in the same manner as described above in connection with the two well system.

What is claimed is:

1. A low friction loss method for fracturig a subterranean hot geothermal earth formation penetrated by a well, wherein a fracturing fluid is injected through the well and into the earth formation at a high velocity to cause fracturing of the formation whereby the rate of heat transfer between the formation and the formation fluid is improved, which comprises injecting into the formation a fracturing fluid to which there has been added an electrolessly metal-plated, metal shot propping agent coated with a thermoplastic polymer, and injecting the resulting mixture into the formation via the said well.

2. The method of claim 1 wherein the said fracturing fluid is selected from the group consisting of aqueous fluids and hydrocarbon fluids.

3. The method of claim 1 wherein the said fracturing fluid is water.

4. The method of claim 1 wherein the said fracturing fluid is crude oil.

5. The method of claim 1 wherein the said fracturing fluid is kerosene.

6. The method of claim 1 wherein the said thermoplastic polymer is selected from the group consisting of low-density polyethylene, high-density polyethylene, polypropylene and polycarbonates.

7. The method of claim 1 wherein the said resulting mixture contains from about 0.2 to about 5.5 pounds per gallon of the said propping agent.

8. The method of claim 1 wherein the said fracturing mixture comprises a fracturing fluid selected from the group consisting of aqueous fluids and hydrocarbon fluids, the said electrolessly plated propping agent is selected from the group consisting of nickel-plated steel shot and cobalt-plated steel shot and the said thermoplastic is selected from the group consisting of low-density polyethylene, high-density polyethylene, polypropylene and polycarbonates.

9. The method of claim 1 wherein the said fracturing mixture comprises water containing about 2.1 pounds per gallon of low-density, polyethylene-coated, nickel-plated, steel shot.

10. The method of claim 1 wherein the said metal-plated propping agent is electrolessly plated steel shot.

* * * * *